United States Patent [19]

Ward et al.

[11] Patent Number: 4,920,247
[45] Date of Patent: Apr. 24, 1990

[54] RESISTANCE WELDING

[75] Inventors: Thomas A. Ward, Holts Summit; Larry K. Gove, Linn, both of Mo.

[73] Assignee: Westinghouse Electric Corp., Pittsburgh, Pa.

[21] Appl. No.: 270,559

[22] Filed: Nov. 14, 1988

[51] Int. Cl.$^5$ .......................... B23K 11/02; B23K 9/24
[52] U.S. Cl. ...................................... 219/103; 219/119
[58] Field of Search ...................... 219/86.25, 103, 119

[56] References Cited

U.S. PATENT DOCUMENTS

| | | | |
|---|---|---|---|
| 4,020,316 | 4/1977 | Schaft et al. | 219/103 |
| 4,409,459 | 10/1983 | Nakayama | 219/103 X |
| 4,609,805 | 9/1986 | Tobita et al. | 219/119 X |

Primary Examiner—George H. Miller, Jr.
Attorney, Agent, or Firm—H. Diamond

[57] ABSTRACT

The endwise resistance welding of a weld coupling to a plate. The weld coupling is mounted in a collet which is mounted slideably in a cavity in a block of conducting material. In the standby condition of the apparatus the collet is urged outwardly of the cavity by a spring between the block and the collet. The end of the block at the entrance to the cavity and the outward end of the collet have frustro-conical or tapered surfaces tapered at the same angle to the common axis of the block and collet. The surfaces are face-to-face. This assembly including the weld coupling is mounted on the movable electrode of the welder. During welding this electrode is moved towards the cooperative electrode, on which the plate is mounted, compressing the weld coupling against the plate. Under the reactive forces from the coupling and plate, the collet is moved inwardly of the block causing the tapered surface of the collet to slide with a cam-like motion along the tapered surface of the block. The collet is clamped tightly to the weld coupling and the engagement of the tapered surfaces complete a low-resistance path for the welding current from the movable electrode, through the block, the collet laterally through the weld coupling, the plate, and the cooperative welding electrode.

11 Claims, 5 Drawing Sheets

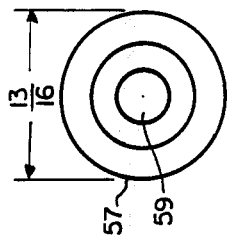
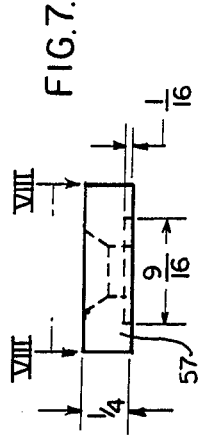
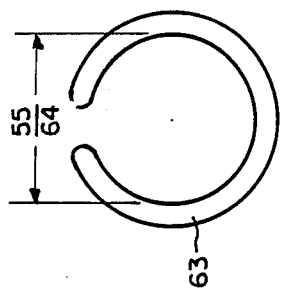
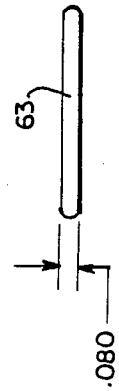
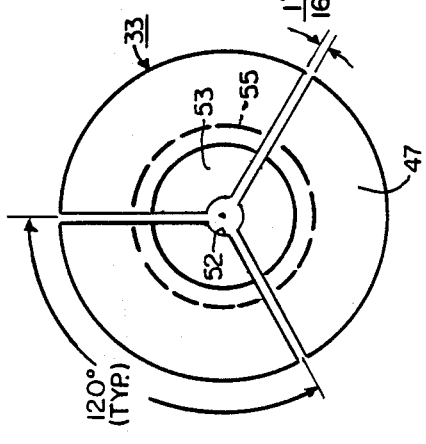
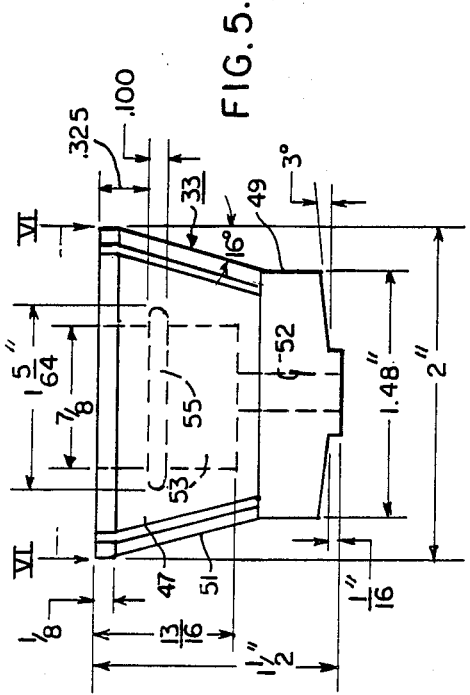

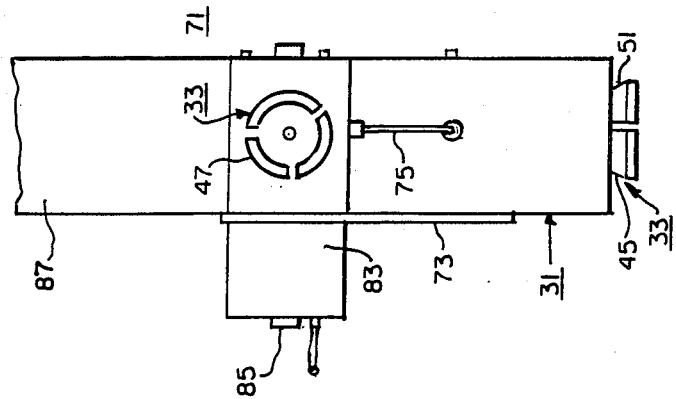
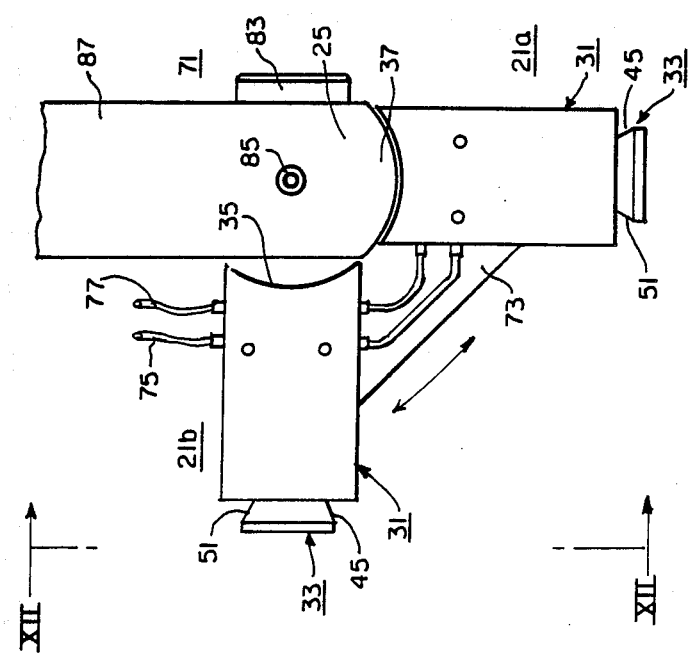

RESISTANCE WELDING

BACKGROUND OF THE INVENTION

This invention relates to resistance welding and it has particular relationship to the joining, metallurgically, of a member of relatively small transverse cross-section to a plate. Specifically, this invention concerns itself with the joining of a weld coupling, i.e., a nut or fitting to a plate. The weld coupling and plate may be composed of stainless steel or any other alloy or metal. A typical weld coupling to be joined to a plate is a threaded pipe section having an outside diameter of ⅞-inch and an inside diameter of ½-inch and a height or length of ¾-inch. The thickness of this coupling is 3/16-inch. Another typical weld coupling has an outside diameter of 1⅛ inches and an inside diameter of ¾-inch and a height also of ¾-inch. The thickness of this coupling is also 3/16-inch.

In the interest of relating to concrete structures to aid those skilled in the art to practice this invention, this application will describe this invention as applying to the joining of weld coupling to a plate. It is understood that any adaptation of the principles of this invention to the joining of members of other structures than a weld coupling to a plate is within the scope of equivalents of any patent which may issue on, or a result of, this application.

In accordance with the teachings of the prior art, the weld coupling and plate are interposed between the welding electrodes with the weld coupling endwise on the plate. Specifically, the plate is disposed on a fixed lower electrode and the weld coupling is engaged by the upper movable electrode. Welding current is then transmitted through the electrodes and the weld coupling and the plate to join the weld coupling to the plate. In the resort to this prior art practice, it has been found that the upper welding electrode which engages the nut has a short service life, the threads of the weld coupling which are near the rim of weld coupling engaged by the upper electrode are burned and a high current is demanded through the electrodes and the weld coupling to effectuate the welding.

It is an object of this invention to overcome these drawbacks and deficiencies of the prior art and to provide welding apparatus and a method of joining, metallurgically, weld couplings to a plate in whose use and practice the welding electrode engaging the weld shall have a long life, the threads of the weld coupling shall not be burned and the joining shall be effectuated with substantially less welding current than is demanded by prior-art practice.

SUMMARY OF THE INVENTION

This invention arises from the discovery that the low service life of the electrode, which engages the weld coupling, the burning of the threads of the weld coupling and the excessive welding current demanded, all arise from the concentration of current at the joint between the upper electrode and the weld coupling. The principle upon which successful resistance welding depends is the presence of a relatively high electrical resistance at the joint between the parts to be welded in an otherwise low-resistance circuit and the development of high $I^2R$ at this joint, I, being the welding current and R being the resistance at the joint. In the prior-art practice there are two regions of relatively high resistance; one at the joint between the upper electrode and the weld coupling, which is of relatively small transverse cross-section and the other between the coupling and the plate to which it is to be joined. $I^2R$ heat is developed at both joints resulting in the short life of the upper electrode and the burning of the thread. Because of the two high-resistance joints, the magnitude of the current demanded to produce an effective metallurgical joint between the coupling and the plate is also high. This high current, in turn, exacerbates the burning at the joint between the upper electrode and the coupling.

In accordance with this invention, a path of low electrical resistance is provided between the electrode connected to the coupling and the joint of the coupling and the plate by a holder for the coupling. The holder includes a block of highly electrically conducting material, typically copper. The block engages the electrode to which it is connected firmly and over a substantial area so that the electrical resistance at the joint between the electrode and block is minimized. In apparatus which is provided with facilities for joining couplings of different dimensions to plates, a plurality of separate holders are provided for the couplings of different dimensions and the block in each holder is provided with an arcuate surface to mesh or mate with an arcuate surface of the electrode of the same radius. A collet for engaging the coupling is slideable within the block in a cavity which extends from within the block and opens in the surface opposite to the surface of the plate engaged by the welding electrode. The collet is formed of a plurality of separate segments also composed of highly electrically conducting material, typically copper. The block is provided with a frustro-conical or tapered surface at the entrance to the cavity and the collet is provided with a cooperative frustro-conical surface. During welding, the coupling is engaged with the plate under pressure and the coupling, under the reactive force from the pressure, is moved into the cavity. The tapered surfaces are engaged and the tapered surface of the collet moves cam-like along the tapered surface of the block so that the collet is caused to clamp the coupling which it engages and to minimize the resistance at the joint between the collet and the coupling. A spring is interposed between the inner end of the cavity and the collet. The spring urges the collet outwardly. During welding, the coupling and plate are engaged under pressure clamping the coupling and compressing the spring. Welding current flows through the electrodes, holder, coupling and plate. Because the resistance between one electrode and the block which it engages between the block and the collet and between the collet and the coupling is low, the heat developed is concentrated at the joint between the coupling and the plate and an effective metallurgical union is produced at this joint without burning the electrode engaging the coupling, the coupling or its thread and without excessive current.

BRIEF DESCRIPTION OF THE DRAWINGS

For a better understanding of this invention, both as to its organization and as to its method of operation, together with additional objects and advantages thereof, reference is made to the following description taken in connection with the accompanying drawings, in which:

FIG. 5 is a view in side elevation of the collet of the embodiment shown in FIG. 1;

FIG. 6 is a plan view taken in the direction VI—VI of FIG. 5;

FIG. 7 is a view in side elevation of the spacer of the embodiment shown in FIG. 1;

FIG. 8 is a plan view taken in the direction VIII—VIII of FIG. 7;

FIG. 9 is a plan view of the retainer or spring clip of the embodiment shown in FIG. 1;

FIG. 10 is a view in side elevation of this retainer;

FIG. 11 is a view in front elevation showing the holder and the associated welding electrode of an embodiment of this invention for joining couplings of different dimensions to a plate or plates; and FIG. 18 is a view in side elevation taken in the direction XII—XII of FIG. 11.

FIGS. 2 through 5 and 7 through 10 show typical dimensions in inches for joining a typical coupling having an outside diameter of ⅛-inch to a plate. These dimensions are included for the purpose of aiding those skilled in the art to understand and practice this invention and not with any intention of in any way limiting the scope of any patent which may issue or as a result of this application.

DETAILED DESCRIPTION OF EMBODIMENTS

Figure 1:
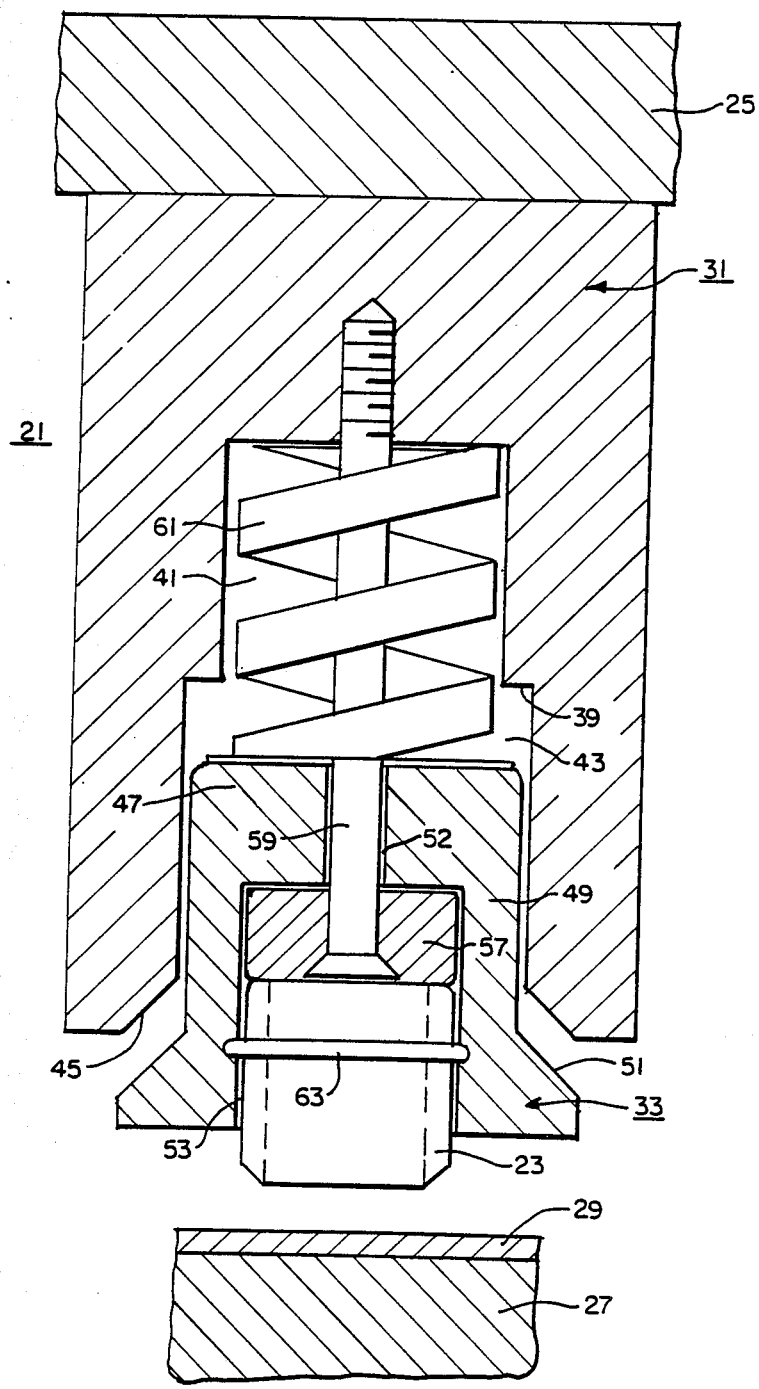
FIG. 1 is a view in longitudinal section, with certain parts shown not sectioned in the interest of clarity, of an embodiment of this invention.

The apparatus shown in the drawings includes a holder 21 for a weld coupling 23 interposed between the electrodes 25 and 27 of a resistance welder (other parts of welder not shown). The holder 21 is engaged with electrode 25. A plate 29 to which the coupling 23 is to be joined metallurgically is disposed on electrode 27. The welder includes a drive (not shown) for advancing the electrodes 25 and 27 into welding relationship with each other. Both electrodes may be advanced, or only one of the electrodes, typically 25, may be advanced towards the other.

Figure 2:
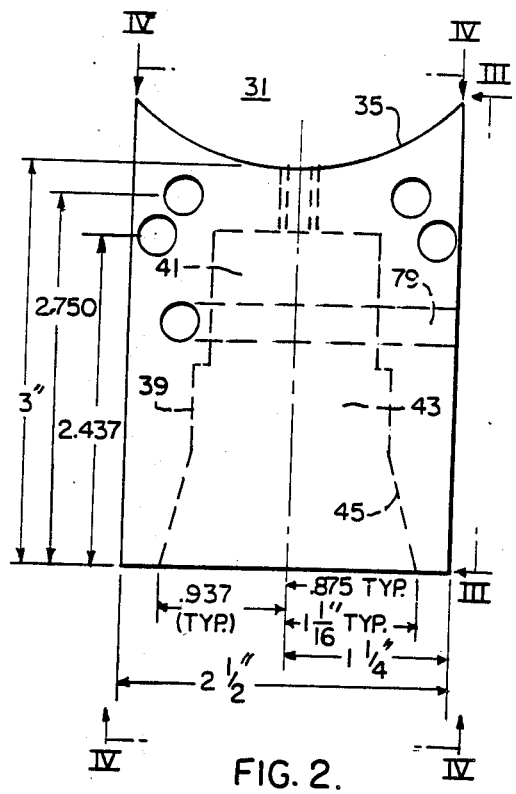
FIG. 2 is a view in side elevation of the block of the embodiment shown in FIG. 1.
Figure 3:
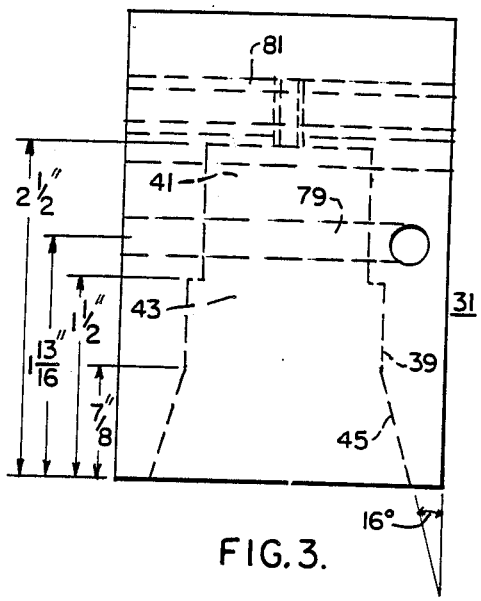
FIG. 3 is a view in end elevation, taken in the direction III—III of FIG. 2.
Figure 4:
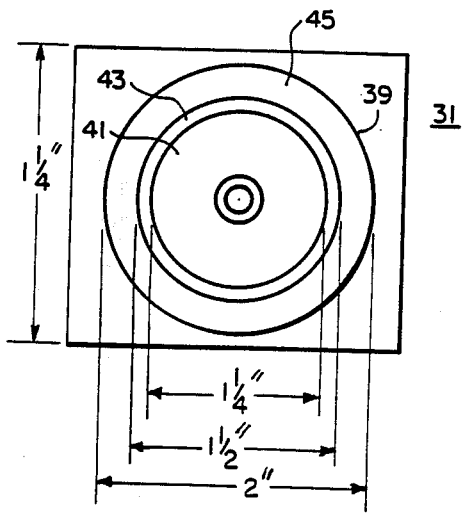
FIG. 4 is a bottom view, with reference to FIG. 2, taken in the direction IV—IV of FIG. 2.

The holder 21 includes a block 31 (FIGS. 2-4) of highly electrically conducting material, and a collet 33 (FIGS. 5, 6). The block 31 is generally in the shape of a rectangular parallelapiped, except at the end engaged by the electrode where it has an arcuate concavity 35 along one dimension. The electrode 25 has a convex surface 37 (shown in FIG. 11) along the corresponding dimension. When the holder 21 is engaged with the electrode 25, the convex surface 37 seats in, or meshes with, the concavity 35. This feature has the advantage that it enhances the surface of engagement of the electrode 25 and the block 31, thus reducing the electrical resistance at the joint between the electrode and the holder. This arcuate engagement of the holder and the electrode also plays an indispensible role in the interchange of holders for couplers of different dimensions as disclosed in FIGS. 11 and 12.

A central axial cavity 39 of circular transverse cross-section throughout extends into block 31 from the end opposite the surface which engages the electrode 25. At its innermost end, the cavity has a circularly cylindrical pocket 41. This pocket 41 merges into a circularly cylindrical section 43 of increased diameter. The section 43 terminates in a frustro-conical or tapered lip 45 at the entrance to the cavity 39.

Figure 6A:
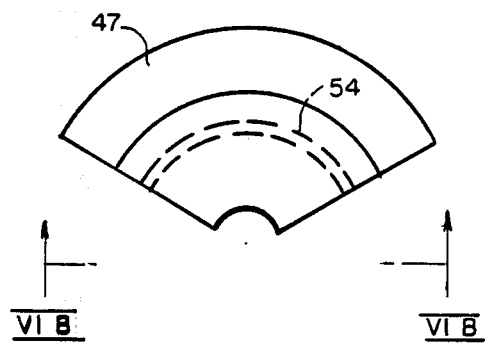
FIG. 6A is a plan view of a segment of the collet of the apparatus shown in FIG. 1.
Figure 6B:
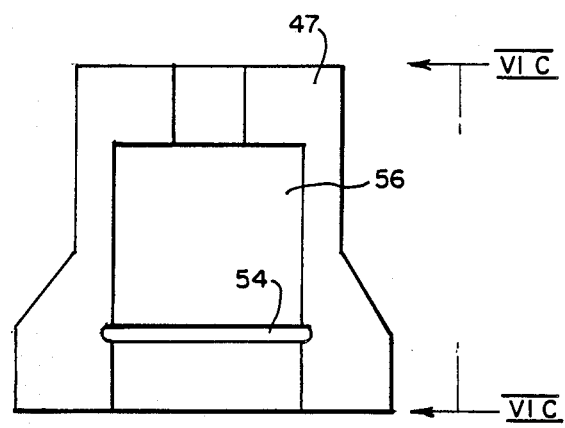
FIG. 6B is a view in side elevation taken in the direction VIB—VIB of FIG. 6A.
Figure 6C:
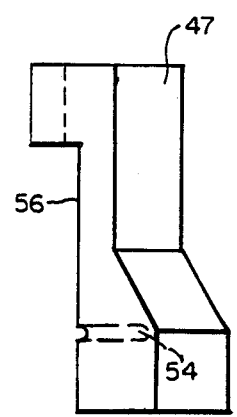
FIG. 6C is a view in end elevation taken in the direction VIC—VIC of FIG. 6B.

The collet 33 includes three separate converging or meshing 120° segments 47 (FIGS. 6A, 6B, 6C) forming an overall collet structure including a circularly cylindrical stem 49 from which a frustro-concial section 51 extends (FIGS. 5, 6). The surface of the section 51 is at substantially the same angle to the axis of the collet as the tapered surface 45 is to the axis of the block 31. The segments 47 are composed of highly electrically conducting material. The stem 49 is dimensioned to slide along the wall of the cavity 39 in section 43 of the block 31. The collet 33 has a circularly cylindrical coaxial cavity 53 extending through the frustro-conical section 51 into the stem 49 for receiving the coupling 23. The cavity 53 communicates with a hole 52 which extends inwardly through the stem 49. The cavity is formed by arcuate 120° excesses 56 (FIG. 6A) in the segments 47 which are joined flush when the segments are converged or meshed. The segments 47 each has a transverse 120° notch 54. When the segments are converged, the notches 54 are coextensive forming the circular notch 55 in the cavity 53. The holder 21 also includes a circular spacer 57 which has a central countersunk hole 59.

The collet 33 is mounted coaxially slideably in the section 43 of the cavity 39 in block 31. It is retained in the block by a bolt 59 which is threaded into block 31 at its inner end. The head of the bolt engages the spacer 57 in the counterbore. The spacer 57 is disposed in the inner end of the cavity 53 and the bolt 59 extends through the hole 52 into the block 31. The spacer 57 is slideable on the bolt 59 upwardly and downwardly as seen in FIG. 1. During standby the collet is urged outwardly by a spring 61 which engages the inner surface of the pocket 41 at one end and the inner end of the collet at the opposite end. The frustro-conical or tapered surfaces 45 and 51 are face-to-face. The weld coupling 23 is mounted in the outward portion of the cavity 53 and is retained by a spring clip 63 (FIGS. 9, 10) which is seated in notch 55.

In assembling the holder, the segments 47 are converged, the spacer 57 and bolt 59 are assembled with the bolt extending through the hole in the spacer and its head in engagement with the counterbore. The spacer and bolt assembly is then inserted into the cavity 53 and the bolt 59 is passed through the hole 52. The spring is inserted in cavity 41 and the assembly including the converged segments 47, the spacer 57 and bolt 59 is inserted in cavity 43 and the bolt passed through spring 59 and threaded into block 31.

In the use of the apparatus, the plate 29 is disposed on electrode 27 and the coupling 23 is mounted in the cavity 53 of the collet 33 and is held there by the spring clip 63 which is engaged in groove 55 in the collet. The coupling 23 is then brought into engagement under pressure with plate 29 by movement of one or both electrodes 25 and/or 27. The spacer 57, collet 33 and coupling 23 are moved inwardly and the tapered surfaces 45 and 51 are engaged. Surface 51 moves cam-like along surface 45. The collet 33 is clamped tightly laterally around the coupling 23 and the spring 61 is compressed. Welding current is transmitted through the electrode 25, the block 31, the coupling 23, the plate 29 and the electrode 27. The joints between the electrode 25 and the block 31, between the block 27 and the collet 33 and between the collet and coupling 23, are of low electrical resistance and the heat is concentrated at the joint between the coupling and the plate and a sound weld is produced without damage to electrode 25 or the coupling 23.

FIGS. 11 and 12 show an electrode holder assembly 71 for joining weld couplings of different dimensions to a plate. Typically, such an assembly is used to join couplings of 1⅛ inches or ⅝-inch outside diameter to a plate. Blocks 31 of the same dimensions may be used for both couplings. The only difference is in the collets for the couplings of the two dimensions and the sole difference here is in the diameter of the cavity 53 and the notch 55 (FIG. 5). For the 1⅛-inch coupling, the diameter of the cavity is 1⅛ inches and the maximum diameter of the notch is 1-21/64 inches. The dimensions for the ⅝-inch coupling are shown in FIG. 5. The cavity 53 is, in each case, of the same diameter as the coupling 23, but the segments 47 of the collet are separate and they can be opened against the pressure exerted by the spring clip 63 to admit the coupling in each case.

The electrode-holder assembly 71 includes a bracket 73 on which the holders 21a and 21b are mounted. The blocks 31 of the holders are cooled by water conducted through tubes 75 and 77 connected to the holders and through channel 79 (FIGS. 2, 4) through the blocks. The holders 21a and 21b are secured to the bracket 73 by bolts which pass through holes 81 (FIGS. 2, 4) in the blocks 31. The holders 21a and 21b are mounted on the bracket 73 with their axes at right angles to each other and the axes of the arcuate surfaces 35 at right angles to the plane of the bracket 73. The apparatus shown in FIGS. 11 and 12 also includes a 90° rotary actuator 83 whose drive shaft 85 is connected at right angles to bracket 73 and passes through a bearing 85 in the welding electrode 87 at right angles to the sides of this electrode. The welding electrode 87 has the arcuate convex surface 37 on the end facing the cooperative electrode (not shown). The bracket 73 and electrode 87 are so positioned that the arcuate surface 35 of block 31 of one of the holders 21a, typically for the 1⅛-inch coupling, is engaged with the surface of electrode 87. The other holder 21b is positioned on the bracket 73 with its axis at right angles to the coextensive axes of electrode 87 and the holder 21a in engagement with the electrode 87. The holder 21b which is out of contact with the electrode 87 is oriented so that by operation of the actuator 83, its arcuate surface is slid along the arcuate surface 37 of electrode 87 into contact with electrode 87 replacing the other holder 21a which is turned so that it is positioned on the right as seen in FIG. 11 with its axis at right angles to the axis of holder 21b. The electrode 87 is wider than the blocks 31 of the holders so that its arcuate surface 37 overlaps the arcuate surfaces of the holders facilitating the interchange of holders 21a and 21b.

While preferred embodiments and preferred practice of this invention have been disclosed herein, many modifications thereof are feasible. This invention is not to be restricted, except insofar as is necessitated by the spirit of the prior art.

We claim:

1. Resistance welding apparatus for joining metallurgically a member of small transverse cross-section endwise to a plate; said apparatus including: a pair of welding electrodes, at least an electrode of said pair movable towards and away from the other, one of said electrodes to support said plate in position to have said member welded thereto, a holder for said member mounted in low-electrical resistance, current-transmitting relationship with said other electrode, said holder including:
    (a) a block of electrically conducting material;
    (b) a collet to engage said member over the surface thereof, and
    (c) means mounting said collet generally coaxially movable in said block;
said collet having means cooperative to actuate said collet to clamp said member and to establish an electrically conducting path of low electrical resistance for the flow of welding current through said electrodes, said block and said collet when said member is brought into contact with said plate to be metallurgically joined to said plate by the movement of said movable electrode towards the other of said pair of electrodes exerting force to move said collet inwardly of said block.

2. The apparatus of claim 1 wherein the mounting means for the collet in the block is resilient, so that when the electrodes are moved towards each other, the mounting means is resiliently stressed and when, after a welding operation, said electrodes are retracted from each other said mounting means is relaxed relieving the force clamping the collet to the member.

3. The apparatus of claim 1 wherein the cooperative actuating means includes tapered regions on the ends of the collet and block, the tapered region of said collet engaging the tapered region of said block and clamping the member by moving inwardly against the tapered region of said block under the force exerted between the plate and the member when the member is brought into contact with the plate to be metallurgically joined to the plate.

4. The apparatus of claim 1 wherein the electrode on which the holder is mounted has an arcuate surface and the holder has an arcuate surface of substantially the same radius as the arcuate surface on the electrode, the curvatures of said holder and electrode being such that said surfaces mesh, the said apparatus also including means mounting said holder rotatably into and out of engagement with said electrode with said arcuate surface of said holder sliding along said arcuate surface of said electrode and forming a seat for said arcuate surface of said electrode when said holder is in current-transmitting relationship with said electrode.

5. The apparatus of claim 4 wherein the arcuate surface of the electrode is convex and the arcuate surface of the holder is concave.

6. In resistance welding apparatus for joining metallurgically a member of small cross-section endwise to a plate by transmitting welding current through a pair of welding electrodes and the member and plate; a holder for said member including an electrically conducting block of generally circularly cylindrical shape; said block being shaped to form a joint of low electrical resistance with one of said electrodes when engaged thereby, said block having an axial cavity therein and having a tapered region along its rim which defines the entrance to said cavity, a collet for receiving said member, said collet having a tapered region near the end thereof, and means, connected to said block and collet for mounting said collet axially movable within said cavity and with said tapered region of said collet facing said tapered region of said block, whereby on displacement of said collet inwardly of said cavity said tapered regions are movably engaged and said collet is set into clamping engagement with a member received therein.

7. The holder of claim 6 wherein the tapered region of the block and the tapered region of the collet are at a substantially equal angles to the axis of the block.

8. The holder of claim 6 wherein the mounting means for the holder includes resilient means interposed between the block and collet, said resilient means being stressed when the tapered region are engaged and relaxed when said tapered regions are disengaged, automatically removing said collet from clamping engagement with the cylindrical member.

9. In resistance welding apparatus for joining metallurgically a member of small transverse cross-section endwise to a plate by transmitting welding current through welding electrodes and said member and plate; a holder for said member including: an electrically conducting block having a cavity therein, said block being shaped to form a joint of low electrical resistance with one of said electrodes when in engagement therewith, a collet for receiving said member, and means connected to said bloc and collet axially movable within said cavity, said block and collet having means cooperative to actuate said collet to clamp a member and to establish a path of low electrical resistance through said block, said collet and said member by the movement inwardly of the cavity of said collet under the force exerted between said member and plate when said member is brought into engagement with said plate to be metallurgically joined to said plate.

10. A resistance welding assembly for joining metallurgically a plurality of hollow cylindrical members of different dimensions to plate means, said members to be joined with their respective axes transverse to the plate means; the said assembly including a welding electrode, a plurality of member-holding units, each unit dimensioned to hold a corresponding said member of a predetermined dimension, each said unit including:

(a) a block of electrically conducting material having an axial cavity therein,
(b) a collet for engaging said corresponding member, and
(c) means mounting said collet coaxially in said cavity movable inwardly and outwardly of said cavity, said block and collet having means cooperative to actuate said collet to clamp said corresponding member when said collet is moved inwardly into said cavity, and means, connected to said member-holding units, for positioning said unit selectively into welding-current-transmission engagement with said electrode, that end of the block of each holding unit to be engaged by said electrode during welding being arcuately concaved and the surface of said electrode to engage said arcuately concaved surface of said each holding unit being arcuately convexed so as to seat in said concaved surface.

11. The method of joining metallurgically a member of small transverse cross-section endwise to a plate with apparatus including a pair of electrodes for resistance welding and a holder for said member; the said method comprising: mounting said holder in low-electrical-resistance engagement with one of said electrodes, mounting said member in said holder with said holder engaging said member laterally, moving one of said electrodes towards the other so that the member in said holder is brought into contact with said plate in position to be metallurgically joined thereto, then applying pressure between the member and the plate thus clamping the member laterally under the reactive force resulting from the pressure between the member and the plate and also establishing a path of low electrical resistance through the holder and the member, while the member is clamped and the low-electrical-resistance path is established transmitting welding current between the electrodes and through the low-electrical-resistance path and the member and the plate to join the member to the plate metallurgically, and after said member is joined to the plate metallurgically separating the electrodes to relax the clamping of the member and to remove the holder from the member.

* * * * *